US006904446B2

(12) United States Patent
Dibrino

(10) Patent No.: US 6,904,446 B2
(45) Date of Patent: Jun. 7, 2005

(54) FLOATING POINT MULTIPLIER/ACCUMULATOR WITH REDUCED LATENCY AND METHOD THEREOF

(75) Inventor: Michael Dibrino, Austin, TX (US)

(73) Assignee: Freescale Semiconductor, Inc., Austin, TX (US)

(*) Notice: Subject to any disclaimer, the term of this patent is extended or adjusted under 35 U.S.C. 154(b) by 632 days.

(21) Appl. No.: 09/939,244

(22) Filed: Aug. 24, 2001

(65) Prior Publication Data

US 2003/0041082 A1 Feb. 27, 2003

(51) Int. Cl.[7] ............................................... G06F 7/38
(52) U.S. Cl. ...................................... 708/501; 708/495
(58) Field of Search ................................ 708/490, 523, 708/501, 620, 495, 708

(56) References Cited

U.S. PATENT DOCUMENTS

| | | | |
|---|---|---|---|
| 4,969,118 A | * 11/1990 | Montoye et al. ............. 708/501 |
| 4,999,802 A | 3/1991 | Cocanougher et al. | |
| 5,185,713 A | * 2/1993 | Kobunaya .................... 708/501 |
| 5,212,662 A | 5/1993 | Cocanougher et al. | |
| 5,450,607 A | * 9/1995 | Kowalczyk et al. ........ 708/524 |
| 5,517,436 A | * 5/1996 | Andreas et al. ............. 708/524 |
| 5,694,350 A | 12/1997 | Wolrich et al. | |
| 5,751,619 A | * 5/1998 | Agarwal et al. ............ 708/523 |
| 5,880,983 A | * 3/1999 | Elliott et al. ................ 708/501 |
| 6,061,707 A | * 5/2000 | Dibrino et al. .............. 708/505 |
| 6,275,838 B1 | * 8/2001 | Blomgren et al. .......... 708/501 |
| 6,425,070 B1 | * 7/2002 | Zou et al. ...................... 712/35 |
| 6,542,916 B1 | * 4/2003 | Hinds et al. ................ 708/501 |
| 6,751,644 B1 | * 6/2004 | Chng et al. ................. 708/501 |

OTHER PUBLICATIONS

R.K. Montoye et al., "Design of the IBM RISC System/6000 floating–point execution unit", IBM J. Res. Develop., vol. 34, No. 1, Jan. 1990, pp. 59–70.
David R. Lutz et al., "Comparison of two's complement numbers", 1996 Taylor & Francis Ltd., Int. J. Electronics, 1996, vol. 80, No. 4, pp. 513–523.

(Continued)

Primary Examiner—Kakali Chaki
Assistant Examiner—Chat C Do
(74) Attorney, Agent, or Firm—Robert L. King

(57) ABSTRACT

A circuit (10) for multiplying two floating point operands (A and C) while adding or subtracting a third floating point operand (B) removes latency associated with normalization and rounding from a critical speed path for dependent calculations. An intermediate representation of a product and a third operand are selectively shifted to facilitate use of prior unnormalized dependent resultants. Logic circuitry (24, 42) implements a truth table for determining when and how much shifting should be made to intermediate values based upon a resultant of a previous calculation, upon exponents of current operands and an exponent of a previous resultant operand. Normalization and rounding may be subsequently implemented, but at a time when a new cycle operation is not dependent on such operations even if data dependencies exist.

15 Claims, 3 Drawing Sheets

OTHER PUBLICATIONS

Stuart F. Oberman et al., "The SNAP Project: Design of Floating Point Arithmetic Units", 1997 IEEE Computer Society, Proceedings of $13^{th}$ Symposium on Computer Arithmetic, pp. 156–165.

M.J. Flynn et al., "The SNAP Project: Towards Sub–Nanosecond Arithmetic", 1995 IEEE, Proceedings on $12^{th}$ Symposium on Computer Arithmetic, pp. 75–82.

Brett Olsson et al., RISC System/6000 Floating–Point Unit, IBM RISC System/6000 Technology, 1990, pp. 35–42.

A. Beaumont–Smith et al., "Reduced Latency IEEE Floating–Point Standard Adder Architectures", 1999 IEEE, $14^{th}$ IEEE Symposium on Computer Arithmetic, Apr. 14–16, 1999, pp. 35–42.

* cited by examiner

| CASE | $\text{Int}^1_{Exp}$ | $T^0_{Exp}$ | $B^1_{SHIFT}$ OR $T^0_{SHIFT}$ | RIGHT SHIFT AC AFTER MULTIPLY: |
|---|---|---|---|---|
| 1 | $\text{Int}^1_{Exp} = T^0_{Exp} + C^1_{Exp}$ | $T^0_{Exp} = \text{Int}^0_{Exp} - 24 \times \left\lfloor \dfrac{(N^0_{Dist})}{24} \right\rfloor$ | $B^1_{Shift} = T^0_{Exp} + C^1_{Exp} - B^1_{Exp}$ | 0 BITS A1*T0 OR C1*T0 |
| 2 | | | | 24 BITS A1*T0 OR C1*T0 |
| 3 | $\text{Int}^1_{Exp} = A^1_{Exp} + C^1_{Exp} + 25$ | | $T^1_{Shift} = A^1_{Exp} + C^1_{Exp} - T^0_{Exp} + 25$ | 0 BITS A1*C1 |
| 4 | $\text{Int}^1_{Exp} = A^1_{Exp} + C^1_{Exp} + 49$ | | $T^1_{Shift} = A^1_{Exp} + C^1_{Exp} - T^0_{Exp} + 49$ | 24 BITS A1*C1 |

FIG.4

FLOATING POINT MULTIPLIER/ACCUMULATOR WITH REDUCED LATENCY AND METHOD THEREOF

RELATED APPLICATION

This application is related to copending patent application, U.S. Ser. No. 09/542,016 entitled "Method and Apparatus for Improved Output Denormalization" filed on Apr. 3, 2000 and assigned to the same assignee as the present application.

FIELD OF THE INVENTION

This invention relates generally to data processing systems, and more specifically, to multiplication and accumulation of floating point operands.

BACKGROUND OF THE INVENTION

Floating point operands are commonly used by data processors. A floating point operand has a mantissa and an exponent and a sign as defined, for example, by the IEEE 754 standard. Data processors commonly perform a multiply and add or accumulate operation wherein a product of two operands is subsequently added to a third operand. To acquire higher performance and higher precision in performing this operation, a merging or fusing of the two mathematical operations has been implemented wherein a portion of the addition of the third operand is begun prior to completion of the multiplication of the first and second operands. As operating frequencies have increased and continue to increase, merged 'multiply and accumulate' functions require increasingly longer latencies or delay to compute. The reason for this is that there have been fewer fundamental advances in how to implement the multiply/accumulate function. Therefore, as the clock cycle length shortens, the latency or number of clock cycles to implement the function increases.

A traditional fused multiply/add microarchitecture multiplies two operands while simultaneously bit aligning a third operand to be added. The latency of the shift operation is therefore hidden by latency associated with the multiplication operation. The savings of the bit shifting latency therefore made this architecture popular. The result may require normalization due to the possibility of massive cancellation of the operands in an effective subtract operation resulting in a number of leading zeros in the mantissa of the result. A remaining operation in the form of a rounding operation is lastly required to provide the resultant. It should be noted that this microarchitecture requires sequential steps associated with multiplication, addition, normalization and rounding. An example of this microarchitecture is shown by R. K. Montoye et al. in an article entitled "Design of the IBM RISC System/6000 Floating-Point Execution Unit", IBM J. RES. DEVELOP., Vol. 34 No. 1, January 1990. This information is also disclosed in U.S. Pat. No. 4,999,802.

Another issue associated with pipelined multiplier/accumulators is the processing of two sequential operations wherein a second of the operations requires a result from a first of the operations. This condition is known as a data dependency. When a data dependency exists with a pipelined execution unit, the introduction of the second set of operands must wait the entire latency of the execution unit pipeline associated with the time required for the first operation to complete.

One method to reduce execution unit latencies of dependent operations is shown by R. K. Montoye et al. in an article entitled "Design of the IBM RISC System/6000 Floating-Point Execution Unit", IBM J. RES. DEVELOP., Vol. 34 No. 1, January 1990. This method eliminates the rounding latency by forwarding a dependent operand prior to rounding back to the floating-point unit and performing the operand increment in a multiplier array.

A latency reduction technique specific to addition operations recognizes that right-shifting of a first addend and normalizing the resulting sum can be mutually disjoint, depending upon the exponent difference and the possibility of massive cancellation of leading edge zeroes in the sum. For addition operations in which the exponents of the addends differ in magnitude by at most one bit, a condition referred to as "Near", the sum may require normalization but the first addend does not require right-shifting. For addition operations in which the exponents of the addends differ in magnitude by more than one bit, a condition referred to as "Far", the sum does not require normalization because the possibility of large numbers of leading edge zeroes does not exist, but the first operand may require shifting. Consequently, latency associated with the addition may be reduced by using two paths. One path is associated with the Near condition and one path is associated with the Far condition. In the Near path, normalization occurs but no significant (i.e. greater than one bit) addend shifting is performed. In the Far path, addend shifting is implemented but no normalization is performed. Consequently, latency is reduced because both addend right shifting and normalization never occur simultaneously. Note also that this technique does not work for a fused multiply/add operation because conditions may exist in which addend shifting and normalization are both required simultaneously.

Another floating point latency reduction technique is shown by A. Beaumont-Smith et al. in "Reduced Latency IEEE Floating-Point Standard Adder Architectures", ChiPTec, Department of Electrical and Electronic Engineering, The University of Adelaide, Adelaide, 5005, Australia. A. Beaumont-Smith et al. show the incorporation of the rounding function into an adder that sums the partial products from the multiplier array. This technique is referred by A. Beaumont-Smith et al. as "Flagged-Prefix Addition". Unnormalized results from the adder are forwarded as inputs to the floating point pipeline. The structure is unable to perform both multiplication and addition.

Wolrich et al. teach in U.S. Pat. No. 5,694,350 a rounding adder for a floating point processor. Rounding is performed prior to normalization rather than after by incorporating the rounding function in the adder. Latency may therefore be reduced. Another example of incorporating rounding prior to a normalization step is provided by S. Oberman et al. in "The SNAP Project: Towards Sub-Nanosecond Arithmetic", Proceedings IEEE 13$^{th}$ International Symposium on Computer Arithmetic, pgs. 148–155, Asilomar, Calif., July 1997.

BRIEF DESCRIPTION OF THE DRAWINGS

The present invention is illustrated by way of example and is not limited by the accompanying figures, in which any like reference numbers indicate similar elements.

FIG. 4 illustrates in table form a truth table for the control function for the multiplier and accumulator of FIGS. 1 and 3.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention. Elements that are common between the figures are given the same element number.

DETAILED DESCRIPTION

Figure 1:
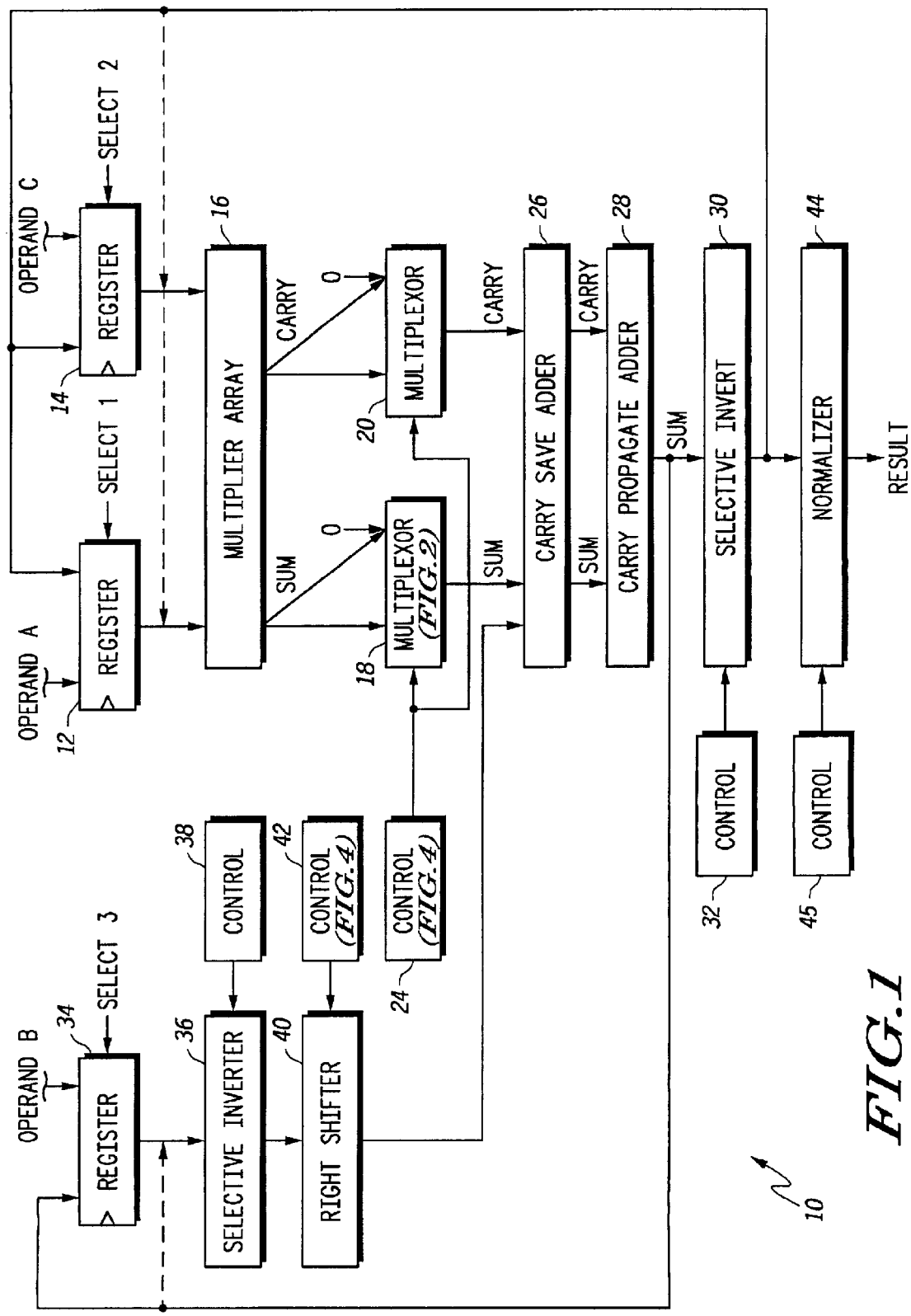
FIG. 1 illustrates in block diagram form a merged multiplier and accumulator in accordance with the present invention.

Illustrated in FIG. 1 is a block diagram of a multiplier and accumulator 10 having significantly reduced latency. In the illustrated form, multiplier and accumulator 10 processes a first operand, a second operand and a third operand by multiplying input operands A and C and adding an input operand B to the resulting product. A register 12 has a first input for receiving input operand A, and a register 14 has a first input for receiving an input operand C. Register 12 has a control input for receiving a control signal labeled 'Select 1', and register 14 has a control input for receiving a control signal labeled 'Select 2'. An output of register 12 is connected to a first input of a multiplier array 16. An output of register 14 is connected to a second input of multiplier array 16. A sum output of multiplier array 16 is connected to a first port of a multiplexor 18. A portion of a second port of multiplexor 18 is connected to a binary zero value and a portion of the sum output of multiplier array 16 as will be further detailed in FIG. 2. A carry output of multiplier array 16 is connected to a first port of a multiplexor 20. A second port of multiplexor 20 is connected to a binary zero value and a portion of the carry output of multiplier array 16. A control circuit 24 is connected to a control input of each of multiplexor 18 and multiplexor 20. Multiplexor 18 and multiplexor 20 collectively form multiplexor circuitry for the multiplier and accumulator 10. An output of multiplexor 18 is connected to a first or sum input of a carry save adder 26. An output of multiplexer 20 is connected to a second or carry input of carry save adder 26. A sum output of carry save adder 26 is connected to a first input of a carry propagate adder 28. A carry output of carry save adder 26 is connected to a second input of carry propagate adder 28. Carry save adder 26 and carry propagate adder 28 collectively form adder circuitry for the multiplier and accumulator 10. A sum output of carry propagate adder 28 is connected to an input of a selective invert circuit 30. The sum output of carry propagate adder 28 and an output of selective invert circuit 30 is a mantissa portion of a resultant operand from the multiply/accumulate operation. A control circuit 32 is connected to a control input of the selective invert circuit 30. The output of the selective invert circuit 30 is fed back to a second input of register 12 and to a second input of register 14. As indicated by a dashed line in FIG. 1, the output of the selective invert circuit 30 may also be directly connected to the first and second inputs of multiplier array 16 rather than coupled via registers 12 and 14. The output of the selective invert circuit 30 is also connected to an input of a normalizer circuit 44. A control circuit 45 is connected to a control input of normalizer circuit 44. An output of normalizer circuit 44 provides an accumulated product Result that represents the product of operands A and C summed with operand B. A register 34 has a first input for receiving operand B. A second input of register 34 is connected to the Sum output of carry propagate adder 28. This connection from carry propagate adder 28 to register 34 and the connection from the output of selective invert circuit 30 to registers 12 and 14 (or directly to multiplier array 16) form feedback circuitry. A select signal labeled 'Select 3' is connected to a control input of register 34. An output of register 34 is connected to an input of a selective inverter 36. Selective inverter 36 has a control input connected to a control circuit 38 and has an output connected to an input of shifting circuitry in the form of a right shifter 40. A control input of right shifter 40 is connected to a control circuit 42. An output of right shifter 40 is connected to a third input of carry save adder 26.

In operation, multiplier and accumulator 10 is implemented in an integrated circuit and performs the mathematical function on floating point data of multiplying operand A times operand C and adding the result with operand B with significantly reduced latency. The present invention applies to any type of floating point operand as defined in any of the numerous specifications existing for floating point operands. However, in the discussion herein, the IEEE 754 specification for single precision will be assumed. Registers 12 and 14 initially store their respective operands A and C. During subsequent calculations, the control signals Select 1 and Select 2 determine whether subsequent operands A and C are stored or whether a prior resultant that is fed back is stored in lieu of one of operands A and C. The Select signals are generated in response to execution of a data processing instruction. Typically data processing instructions are represented by operational code (op code) and the operational code is executed. Clocking of the multiplier and accumulator 10 is not expressly illustrated, but it should be understood that the multiplier and accumulator 10 is synchronous and is clocked by a synchronous clock signal (not shown). When registers 12 and 14 provide multiplier array 16 with inputs, multiplier array 16 performs a multiplication and generates a sum and a carry output. It should be well understood that multiplier array 16 may be implemented with any of numerous types of known array multipliers. Specifically, the reduced latency provided herein may be achieved by using any type of array multiplier to implement multiplier array 16. Each of multiplexers 18 and 20 selects the bit positions of the sum and carry outputs of multiplier array 16 in response to control circuit 24 as will be described in detail below. The operation of adding operand B is merged into the multiplication operation by adding a shifted version of operand B into carry save adder 26. Carry save adder 26 adds the selectively modified and shifted addend from register 34 to the sum and carry representation of the product of A and C from multiplier array 16. The resulting sum and carry outputs of carry save adder 26 are combined by carry propagate adder 28 into a single cumulative sum that is the mantissa of the multiply/accumulate operation. The sum is subsequently normalized by normalizer 44 prior to providing the result. Normalization is the removal of leading edge zeroes from the sum. If the sum is negative (i.e. has a negative sign), the sum is inverted by selective invert circuit 30 in response to control circuit 32 and prior to normalization. For negative signed sums, selective invert circuit 30 inverts a logic state of each bit position of the sum.

Register 34 stores operand B. A selective bit inversion that changes the logic value of each bit (i.e. zeroes to ones and vice versa) of operand B is performed in response to control circuit 38. Control circuit 38 needs several criteria to determine whether or not to perform bit inversion and the criteria will vary slightly depending upon whether or not the operation involves a dependent operand. First assume the situation where none of the values of Operands A, B and C are dependent upon a prior operation that has not been completed (i.e. written back to a register file). Control circuit 38 must know the sign bit of each of the floating point operands A, B and C. Control circuit 38 must also know whether the operation involving operand B is an add or a subtract of B to the product of A and C. Whether an inversion is performed depends upon an exclusive OR operation of the sign bits of operands A, B and C and the type of operation depicted in the operation code, wherein logic one is used for a subtract and a logic zero is used for an add. If the exclusive OR operation results in a logic one, a logic inversion of operand B is performed. If the exclusive OR operation results in a logic zero, no logic inversion of operand B is performed. Assume however that one (and only one) of the values of Operands A, B and C is dependent upon a prior operation that has not been completed. In that situation whether control circuit 38 signals an inversion depends on the exclusive OR of the sign of the two non-dependent operands and the dependent feedback operand that is the sign of the Sum output of carry propagate adder 28 and whether the operation defined by the operation code is an add or a subtract. If the operation is an add, a logic one is used, and if the operation is a subtract a logic zero is used. The resulting exclusive OR operation determines whether or not selective inverter 36 performs a logic inversion. If a logic one results from the exclusive OR, an inversion is performed.

Control circuit 32 performs two functions. The first function of control circuit 32 is to generate the sign bit for the feedback operands that go to registers 12 and 14. The sign bit is computed in a manner similar to the inversion select signal generated by control circuit 38. The only difference in generating the feedback sign bit for registers 12 and 14 is that instead of the sign of the sum from carry propagate adder 28 replacing the sign bit of operand B, it replaces the sign bit of operand A or operand C depending upon which operand is the dependent operand (i.e. whose value is dependent upon an operation that has not completed). The second function of control circuit 32 is to selectively invert the mantissa being fed back to registers 12 and 14 and coupled to normalizer 44 to ensure that the mantissa is represented as a positive quantity. If the sum is not to be fed back (i.e. no near term future operands are dependent upon the sum), and if the sum is negative, the sum should be inverted and used by normalizer 44. If the sum is not to be fed back and the sum is positive, the sum is used by normalizer 44 without being inverted.

If the output of selective invert circuit 30 is fed back as a dependent operand, the mantissa is always fed back to register 12 or register 14 as a positive quantity so that the multiplication will be correct. In other words, if the sum from carry propagate adder 28 is negative, it is inverted prior to being fed back to registers 12 and 14 and the sign of the sum is used for the sign bit of the dependent operand that is fed back.

It should be noted that latency of the normalizer 44 is eliminated for dependent operands as a result of the feedback of the sum (either in inverted form or non-inverted form) from the output of carry propagate adder 28 to registers 12, 14 and 34. For independent operands, the latency of the normalizer is not removed, but that situation is not critical because there is no near term dependent operands waiting on the normalization function to be able to begin execution.

Figure 2:
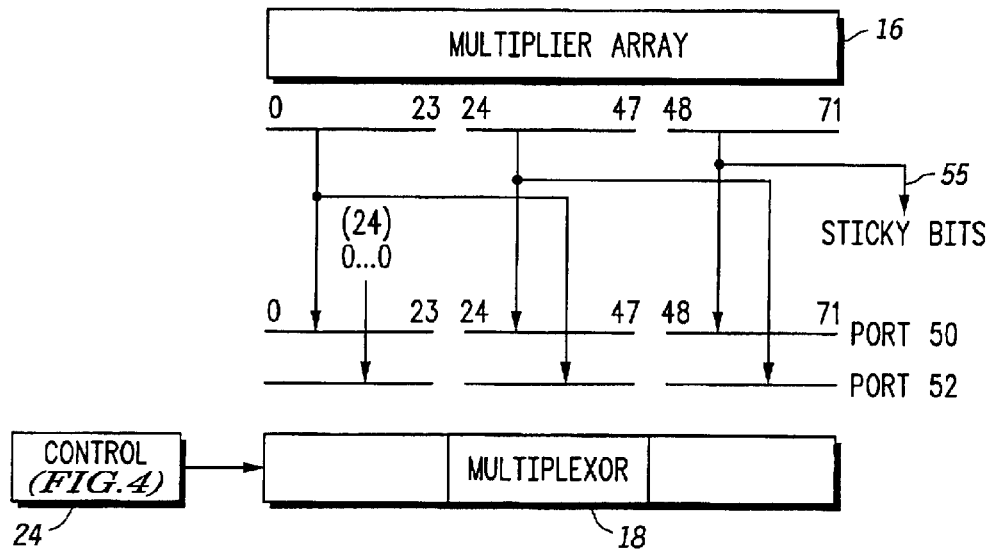
FIG. 2 illustrates in block diagram form a portion of the multiplexors of the multiplier and accumulator in accordance with the present invention.

Illustrated in FIG. 2 is a further detail of the bit shifting that occurs on the output of multiplier array 16 within multiplexor 18 in response to control circuit 24. For convenience of illustration, identical elements in common between FIG. 2 and FIG. 1 are identically numbered. Also, FIG. 2 illustrates on the bit shifting associated with the sum portion of the product. An identical bit shifting also exists for the carry portion (not shown) of the product. There are 72 bits illustrated in FIG. 2, by way of example only, because the feedback operand could be 48 bits that is being multiplied by a 24-bit nondependent operand yielding up to 72 bits of result. The use of 24-bit mantissa size is a common mantissa size for single precision floating-point arithmetic standards. In the illustrated form, the 72-bit field is divided into three 24-bit portions. Under control of control circuit 24, the output of multiplier array 16 is either directly coupled to multiplexor 18 without any bit shifting, or the output of multiplier array 16 is shifted by 24 bits to the right with a leading 24 bits of zeroes inserted in the left-most bit positions 0–23. Multiplexor 18 has two port inputs, respectively labeled as port 50 and port 52, to receive the two described forms of input bits. When control circuit 24 selects the shifted version of the output of multiplier array 16, sticky bits are used to round correctly under various IEEE rounding modes. The sticky bits are provided by a conductor 55 when appropriate.

Figure 3:
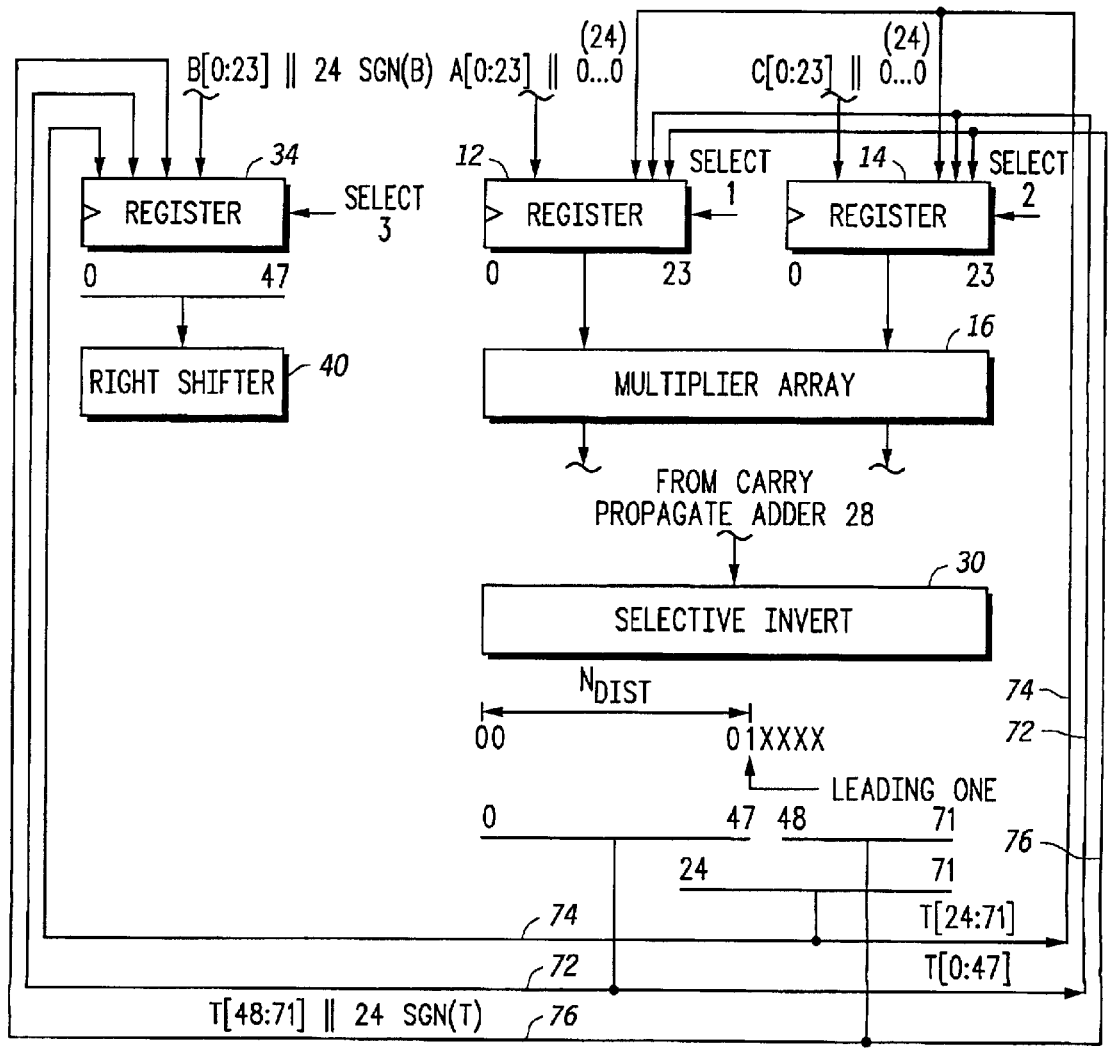
FIG. 3 illustrates in block diagram form the forwarding mechanism for dependent operands processed by the multiplier and accumulator of FIG. 1.

Illustrated in FIG. 3 is more detail of registers 12, 14 and 34 and bit shifting associated with selective invert circuit 30. Register 12 has a first port input of 24 bits of operand A labeled A[0:23] that is concatenated with 24 trailing zeroes to form a 48-bit mantissa. Similarly, register 14 has a first port input of 24 bits of operand C labeled C[0:23] that is concatenated with 24 trailing zeroes to form a 48-bit mantissa. Register 34 has a first port input that receives 24 bits of operand B labeled B[0:23] that is concatenated with 24 copies of its sign bit. Each of registers 12, 14 and 34 has a second port input connected via a feedback path 72 for receiving bits T[0:47] from the output of selective invert circuit 30. Each of registers 12, 14 and 34 has a third port input connected via a feedback path 74 for receiving bits T[24:71] from the output of selective invert circuit 30. Each of registers 12, 14 and 34 has a fourth port input connected via a feedback path 76 for receiving bits T[48:71] concatenated with 24 copies of its sign bit. The number of leading zeroes at the output of selective invert circuit 30 is represented by $N_{DIST}$. This number is variable based upon the value of the sum from carry propagate adder 28. It should be noted that the registers 12, 14 and 34 are implemented as forty-eight bit registers in this embodiment so that by selecting one of conductors 72, 74 or 76, no more than 23 leading zeroes will appear in registers 12, 14 and 34. In addition, there is no fixed binary point in the output of multiplier array 16 as the binary point may vary depending upon where the first leading one appears in the feedback signal from the selective invert circuit 30.

Illustrated in FIG. 4 is a truth table for describing the control function associated with control circuits 24 and 42 and the Select signals controlling registers 12, 14 and 34. In the illustrated form an example is provided involving an initial calculation (0) followed by a second calculation (1). However, it should be appreciated that the same values apply regardless of which successive operations are occurring, such as an eighth and a ninth multiply/accumulate operation. Additionally, the same values provided in FIG. 4 apply for non-successive operations where the $0^{th}$ operation resultant operand is used in a later non-successive $2^{nd}$ operation. In such an application additional storage elements may be required than is illustrated in FIG. 1 to store the earlier resultant operand from a non-successive operation.

In general, FIG. 4 illustrates five columns. Additionally, a numbering convention is used wherein a zero represents a first calculation that is not dependent upon a previous calculation (i.e. an earlier generated operand), and a one represents a second calculation that is data dependent upon a prior calculation. A first column describes four different cases that can occur as will be described below. A second column describes the value of an internal exponent in the pipeline stage that corresponds to the mantissa represented by the sum output of the carry propagate adder 28. The exponent generation circuitry that generates this exponent is not illustrated in circuit detail but can be readily implemented with conventional logic circuits by circuitry within either control circuit 24 or control circuit 42 to implement the equations in the second column. A third column describes the value of the exponent associated with the first calculation in the pipeline stage corresponding to the output of the selective invert circuit 30. An equation is provided in FIG. 4 for creating the exponent value in which an internal exponent value generated during a first calculation is used. The internal exponent value Int0exp has the following value:

i $Int0exp = A0exp + C0exp + 25$ and may be calculated by either control circuit 42 or control circuit 24. To obtain the exponent for the resultant, T0exp, a subtraction is performed. From the internal exponent value is subtracted the quantity $24[N0dist/24]$ that guarantees that fewer than twenty-four zeroes will be coupled back as feedback to any one of registers 12, 14 or 34. A fourth column describes the bit shift amount of either the B operand or a resultant operand T as performed by right shifter 40. A fifth column describes the amount of bit shifting on the product of operands A and T, C and T or A and C that is performed in multiplexors 18 and 20 by control circuit 24. In the specific example, the shifting shown is illustrative of when a data dependency exists. For cases when no data dependency exists, multiplexors 18 and 20 perform a shift of zero.

Assume that operands flowing into the pipeline associated with a first executing data processing instruction begin with the letters A0, B0 and C0 and produce a result T0. A0, B0 and C0 are assumed to not be dependent upon previous operands. Therefore, the calculation by control circuit 42 of the first B0 shift value results in:

$B0_{shift} = A0_{Exp} + C0_{Exp} - B0_{Exp} + 25$ where $A0_{Exp}$ is the exponent in register 12 (corrected for bias), $C0_{Exp}$ is the exponent in register 14 and $B0_{Exp}$ is the exponent in register 34. $B0_{shift}$ indicates how many bit positions the B0 operand should be right shifted by right shifter 40. Result T0 provided by selective invert circuit 30 will be available after some pipeline latency, L.

Assume that the next data processing instruction has one operand that is dependent upon the previous result T0. The instruction will be a command to calculate a resultant T1 that one has one of the following three calculations:

$T1 = B1 + A1 * T0$ $T1 = B1 + T0 * C1$ $T1 = T0 + A1 * C1$

The first column of the FIG. 4 truth table defines four distinct cases that exist when a data dependency exists for a second calculation. A first case is the case where the previous resultant operand T0 is being fed back as either operand A1 or operand C1 and the following condition occurs:

$B1exp \leq T0exp + C1exp - N0_{DIST} + 1$.

A second case is the case where the previous resultant operand T0 is being fed back as either operand A1 or operand C1 and the following condition occurs:

$B1exp > T0exp + C1exp - N0_{DIST} + 1$.

A third case is when the T0 is fed back as operand B1 and $T0exp - N0Dist \leq A1exp + C1exp$.

A fourth case is when the T0 is fed back as operand B1 and $T0exp - N0Dist > A1exp + C1exp$.

The fourth column of the FIG. 4 truth table defines the control of right shifter 40 that shifts either the B1 operand or a prior sum (T0) operand, and the calculated value of $B1_{shift}$ or $T1_{shift}$ determines the number of bits that the right shifter 40 will shift. Control circuit 42 performs the calculation listed in the fourth column of FIG. 4. A B1 shift is calculated for cases one and two, and a T1 shift is calculated for cases three and four.

For example, regardless of which of the three instruction possibilities above occurs, control circuit 42 and control circuit 24 must first know the value for $N0_{Dist}$ from FIG. 3. The third column in FIG. 4 relates to $T0_{Exp}$ and determines the value of the exponent of the first calculation at the pipeline stage corresponding to the output of carry propagate adder 28. The value is used as a feedback exponent value.

The fifth column of FIG. 4 determines how many bits (either 24 or 0) that control circuit 24 forces sum multiplexor 18 and carry multiplexor 20 to right shift the sum and carry values, respectively, generated by the product of either A1 multiplied by T0 or C1 multiplied by T0 or A1 multiplied by C1. When the exponent values between the first and second calculations and the number of leading zeroes from the result of the first calculation create a case one condition and data dependency exists for one of operands A and C, no bit shifting is performed by multiplexors 18 and 20. When the exponent values between the first and second calculations and the number of leading zeroes from the result of the first calculation create a case two condition and data dependency exists for one of operands A and C, a bit shifting of twenty-four bits is performed by multiplexors 18 and 20. When the exponent values between the first and second calculations and the number of leading zeroes from the result of the first calculation create a case three condition and data dependency exists for operand B, no bit shifting is performed by multiplexors 18 and 20. When the exponent values between the first and second calculations and the number of leading zeroes from the result of the first calculation create a case four condition and data dependency exists for operand B, a bit shifting of twenty-four bits is performed by multiplexors 18 and 20.

By now it should be appreciated that there has been provided a merged multiply/add circuit for floating point operands with significantly reduced latency. Feedback of the resultant operation occurs prior to normalization and rounding, thereby removing from the critical speed path the latency encountered with each of the normalization and rounding processing. By utilizing selective shifting in both the data path containing the operand to be added and in the data path associated with the multiplication, the lack of a normalization step is compensated and significant time savings are achieved, specifically for operations in which dependent operands exist. As operating frequencies have increased and cycle lengths have shortened, the number of cycles required to implement the normalization and rounding functions have also increased. Therefore, to remove the latency associated with normalization and rounding from the critical data path required for processing pipelined operations results in significant savings of processing time.

In the foregoing specification, the invention has been described with reference to specific embodiments. However, one of ordinary skill in the art appreciates that various modifications and changes can be made without departing from the scope of the present invention as set forth in the claims below. For example, any type of storage device may be used to implement the register function. The data bit sizes are given by way of example only and any bit size implementation may be used. Various recoding schemes may be used in conjunction with the present invention. Any type of semiconductor processing may be used to implement the associated circuitry. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A floating point multiplier and accumulator for repetitively performing multiplication and addition operations to create a product of a first operand and a second operand and adding a third operand to the product, comprising:
    a multiplier array having a first input and a second input for respectively receiving the first operand and the second operand, and providing a sum and a carry;
    multiplexor circuitry coupled to the multiplier array for selectively bit shifting each of the sum and the carry;
    shifting circuitry for receiving the third operand and selectively bit shifting the third operand;
    adder circuitry coupled to the multiplexor circuitry and the shifting circuitry, the adder circuitry adding the sum, the carry and the third operand to provide at an output thereof a mantissa portion of a resultant operand that has not been normalized or rounded; and
    feedback circuitry coupled to the adder circuitry and the multiplier array, the feedback circuitry coupling the mantissa portion of the resultant operand to either the multiplier array or the shifting circuitry to be subsequently used as one of the first operand, the second operand or the third operand, such feedback being done without first performing normalization or rounding, thereby reducing latency associated with creating the product when one of the first operand, the second operand or the third operand has a value that is dependent upon a previous resultant operand calculated by the floating point multiplier and accumulator.

2. The floating point multiplier and accumulator of claim 1 wherein the adder circuitry further comprises:
    a carry save adder having a first input for receiving the sum, a second input for receiving the carry, and a third input for receiving the third operand, a first output for providing a sum output, and a second output for providing a carry output; and
    a carry propagate adder having a first input coupled to the sum output of the carry save adder, a second input coupled to the carry output of the carry save adder, and an output for providing the resultant operand.

3. The floating point multiplier and accumulator of claim 1 further comprising:
    a normalizer coupled to the output of the adder circuitry, the normalizer removing leading edge zeroes from the resultant operand after the resultant operand has been fed back to be used as one of the first operand, the second operand or the third operand in a subsequent calculation of the floating point multiplier and accumulator.

4. The floating point multiplier and accumulator of claim 1 further comprising:
    a selective inverter coupled to the output of the adder circuitry, the selective inverter changing a logic value of each bit of the resultant operand in response to determining that the resultant operand has a negative sign, selective inversion occurring prior to feeding the mantissa portion of the resultant operand back to the multiplier array but without normalization or rounding of the resultant operand.

5. The floating point multiplier and accumulator of claim 1 further comprising:
    a first register for receiving and selectively storing either the first operand or the resultant operand, the first register being coupled to the first input of the multiplier array, the first register selecting either the first operand or the resultant operand in response to execution of an operational code; and
    a second register for receiving and selectively storing either the second operand or the resultant operand, the second register being coupled to the second input of the multiplier array, the second register selecting either the second operand or the resultant operand in response to execution of the operational code.

6. The floating point multiplier and accumulator of claim 1 further comprising:
    first control circuitry coupled to the multiplexor circuitry for controlling bit shifting of the sum and carry generated by the multiplier array, the first control circuitry performing predetermined calculations to determine a bit shift amount to shift the sum and carry; and
    second control circuitry coupled to the shifting circuitry for controlling an amount of shifting performed by the shifting circuitry.

7. The floating point multiplier and accumulator of claim 1 further comprising exponent generation circuitry for generating an exponent value of the resultant operand based upon an internal exponent value and a number of leading zeroes contained in the resultant operand.

8. The floating point multiplier and accumulator of claim 1 further comprising:
    a register for receiving and selectively storing the third operand or the resultant operand; and
    a selective inverter coupled to the register for selectively inverting a logic state of each bit position of each value stored in the register based upon a sign of each value, the selective inverter having an output coupled to the shifting circuitry.

9. The floating point multiplier and accumulator of claim 1 wherein the shifting circuitry further comprises a right shifter that selectively bit shifts the third operand or the resultant operand in response to predetermined calculations that determine a bit shift amount, if any, to implement.

10. The floating point multiplier of claim 1 wherein the multiplexor circuitry bit shifts each of the sum and carry by a number of bits that is determined, in part, by a number of leading zero bits of the resultant operand from a previous calculation performed by the multiplier array.

11. In an integrated circuit, a method of repetitively performing multiplication and addition operations with floating point data represented by a first operand, a second operand and a third operand, comprising:

storing the first operand, the second operand and the third operand in storage registers;

coupling the first operand and the second operand to an array multiplier;

multiplying the first operand and the second operand to create a sum and a carry;

selectively bit shifting the sum and the carry based upon: (1) a number of leading zero bits of a resultant operand of a previous calculation; (2) exponent values of the first operand and the second operand; and (3) an exponent value of the resultant operand of the previous calculation;

adding the sum and carry to the third operand to form a cumulative sum;

selectively using the cumulative sum as the third operand for a subsequent multiply/accumulate operation, the cumulative sum not being normalized or rounded prior to such use as the third operand.

12. The method of claim 11 further comprising:

inverting the cumulative sum if a sign of the cumulative sum is negative; and selectively using the cumulative sum in a subsequent multiply/accumulate operation, in inverted or non-inverted form, as one of the first operand or the second operand when the cumulative sum is not subsequently used as the third operand, the cumulative sum not being normalized or rounded prior to such use as one of the first operand or the second operand.

13. The method of claim 11 further comprising:

generating an exponent value of the resultant operand based upon an internal exponent value generated using exponents of the first and second operands and based upon a number of leading zeroes contained in the resultant operand.

14. In a floating point hardware multiplier and accumulator, a method for repetitively performing multiplication and addition operations to create a product of a first operand and a second operand and adding a third operand to the product, comprising:

coupling a first operand and a second operand to multiplier array circuitry and providing a sum and a carry in response thereto;

selectively bit shifting each of the sum and the carry and selectively adding a plurality of logic zero bits into a portion of the sum and carry in response to control signals created using exponential values of the first operand, the second operand and the third operand and a previous resultant exponential value;

receiving the third operand and selectively bit shifting the third operand;

adding the sum, the carry and the third operand to provide a mantissa portion of a resultant operand that has not been normalized or rounded; and coupling the mantissa portion of the resultant operand to be subsequently used as one of the first operand, the second operand or the third operand without first performing normalization or rounding, thereby reducing latency associated with creating the product when one of the first operand, the second operand or the third operand has a value that is dependent upon a previous resultant operand calculated by the floating point multiplier and accumulator.

15. The method of claim 14 further comprising:

determining whether the resultant operand is positive or negative and, if the resultant operand is negative, inverting logic state of all bits of the resultant operand prior to using the resultant operand as one of the first operand, the second operand or the third operand in a subsequent calculation.

* * * * *